United States Patent [19]

Jones

[11] Patent Number: 5,761,738
[45] Date of Patent: Jun. 2, 1998

[54] COMPUTER SYSTEM WHICH STORES MANAGEMENT OR CONTROL INFORMATION IN DIFFERENT ADDRESS SPACE BUT SAME OFFSET AS CORRESPONDING DATA

[75] Inventor: Steven Leonard Jones, Rochester, Minn.

[73] Assignee: International Business Machines Corporation, Armonk, N.Y.

[21] Appl. No.: 47,136

[22] Filed: Apr. 8, 1993

[51] Int. Cl.[6] .................................................. G06F 12/00
[52] U.S. Cl. .............................. 711/170; 711/5; 711/154; 711/200
[58] Field of Search ................................. 395/425, 400, 395/405, 497.01, 481; 364/DIG. 1, DIG. 2, 238.4; 711/5, 170, 154

[56] References Cited

U.S. PATENT DOCUMENTS

| | | | |
|---|---|---|---|
| 4,862,349 | 8/1989 | Foreman et al. | 395/200.16 |
| 4,885,681 | 12/1989 | Umeno et al. | 395/400 |
| 4,916,608 | 4/1990 | Shultz | 395/650 |
| 4,918,586 | 4/1990 | Niimura et al. | 395/429 |
| 4,989,134 | 1/1991 | Shaw | 395/425 |
| 5,123,098 | 6/1992 | Gunning et al. | 395/400 |
| 5,276,830 | 1/1994 | Endo et al. | 395/200.16 |
| 5,317,728 | 5/1994 | Tevis et al. | 395/600 |
| 5,454,103 | 9/1995 | Coverston et al. | 395/600 |
| 5,548,729 | 8/1996 | Alayoshi et al. | 395/200.16 |

FOREIGN PATENT DOCUMENTS

| | | |
|---|---|---|
| 0474395 | 8/1991 | European Pat. Off. |
| 0476841 | 8/1991 | European Pat. Off. |
| 57-20982 | 2/1982 | Japan |
| 62-67642 | 3/1987 | Japan |
| 189955 | 8/1988 | Japan |

OTHER PUBLICATIONS

IBM Publication No. SC24–5594–00, "Virtual Machine/Enterprise Systems Architecture—Enterprise Systems Architecture/Extended Configuration Principles of Operation", Release 1.1, pp./ 3–1—3–8.

IBM Publication No. SC24–5453–00, "Virtual Machine/Enterprise Systems Architecture—CMS Application Development Reference For Assembler", Release 1, pp. 19–390.

IBM Publication No. SC24–5520–01, "Virtual Machine/Enterprise Systems Architecture—CP Programming Services", Release 1.1, pp. 533–620.

IBM TDB vol. 17, No. 7, Dec., 1974, "Compatible Virtual Device Storage", by Stamper.

IBM TDB vol. 32, No. 5A, Oct., 1989, "VM Parallel Environment", by Darema-ROgers, et al.

IBM TDB vol. 34, No. 4A, Sep., 1991, "Management of Modified Pages Using VM Data Spaces By SQL/DS", by Fecteau et al.

Kai Hwang, Fayé Briggs, "Computer Architecture and Parallel Processing", 1984, pp. 71–76.

*Primary Examiner*—Tod R. Swann
*Assistant Examiner*—Tuan V. Thai
*Attorney, Agent, or Firm*—Arthur J. Samodovitz

[57] ABSTRACT

A computer system manages storage of data and associated management and/or control information. The system logically divides the storage into a plurality of address spaces with common addressing within each of the address spaces. In response to a request for a block of storage, the system allocates a block of storage at an address from one of the address spaces. The system also reserves another block of storage from another of the address spaces at the same address within the other address space to store corresponding management and/or control information. Next, data is written to the requested block of storage in the one address space, and management and/or control information is written to the other block in the other address space. Thus, the management and/or control information is not confined to the block which contains the actual data. Also, because the management and/or control information is stored at the same offset of this other address space as the offset of the data within the one address space, the management and/or control information can be readily located by using the offset of the data and an identification of this other address space.

12 Claims, 5 Drawing Sheets

COMPUTER SYSTEM WHICH STORES MANAGEMENT OR CONTROL INFORMATION IN DIFFERENT ADDRESS SPACE BUT SAME OFFSET AS CORRESPONDING DATA

BACKGROUND OF THE INVENTION

The invention relates generally to computer systems, and deals more particularly with method and apparatus for accessing management or control information in storage for respective data objects in the storage.

Computer systems include some form of storage, such as magnetic disk. Often many application programs, processes or tasks (users) execute within the computer system and require allocation of some of the storage. In some systems, each user is allocated a fixed amount of private storage at initialization. In other systems, the storage is shared and dynamically allocated by the operating system upon request. Often, the operating system allocates storage in multiples of a minimum block size.

For each block that is allocated in the shared storage system, some systems such as an IBM VM SP 6 Shared File System require that certain bytes of the block store management and control information. The remainder of the block is available for the requestor's data. The control block specifies the current "owner" of the block, the size of the block, the time of access, and accounting information.

For some purposes, it may be helpful to store additional management or control information, more than will fit in the portion of the allocated block dedicated for management and control information. For example, it would be helpful in troubleshooting if the management and control information listed one or more previous "owners" of the same block. It is not realistic to expect that the adjacent block will always be available to store the additional management and control information. However, it was feasible and previously known to include in the portion allocated for control and management information a pointer to another available block that stores the additional management and control information. Nevertheless, the inclusion of the pointer is burdensome because it requires a significant portion of the block. For example, the pointer may require 32 bits.

European Patent Application 91307666.7 discloses a first storage space which stores management information in blocks for respective files in a second storage space. Each file and respective management information block contain a header with a common name which is unique throughout the system. The common name is used to locate the management information block for the respective file. The management information block also includes the address of the respective file for the purpose of locating the file. While this technique provides effective correlation between the file and respective management information block and provides additional storage space for the management information, it requires that the file and management information block each store the file name, and the management information block store the address of the respective file. Also, it requires a function for selecting names which are unique throughout the system.

Accordingly, a general object of the present invention is to provide a system for accessing control or management information for respective, discontiguous data blocks without requiring that the data blocks store either the name or full address of the control or management information.

SUMMARY OF THE INVENTION

The invention resides in a computer system for managing storage. The system logically divides the storage into a plurality of address spaces with common addressing within each of the address spaces. In response to a request for a block of storage, the system allocates a block of storage at an address from one of the address spaces. The system also reserves another block of storage from another of the address spaces at the same address within the other address space to store corresponding management and/or control information.

Next, data is written to the requested block of storage in the one address space, and management and/or control information is written to the other block in the other address space. Thus, the management and/or control information is not confined to the block which contains the actual data. Also, because the management and/or control information is stored in the same address within the other address space, the management and/or control information can be readily located without addressing within the block which contains the actual data to the offset within the other address space which contains the management and/or control information.

DETAILED DESCRIPTION OF THE PREFERRED EMBODIMENTS

Figure 1:
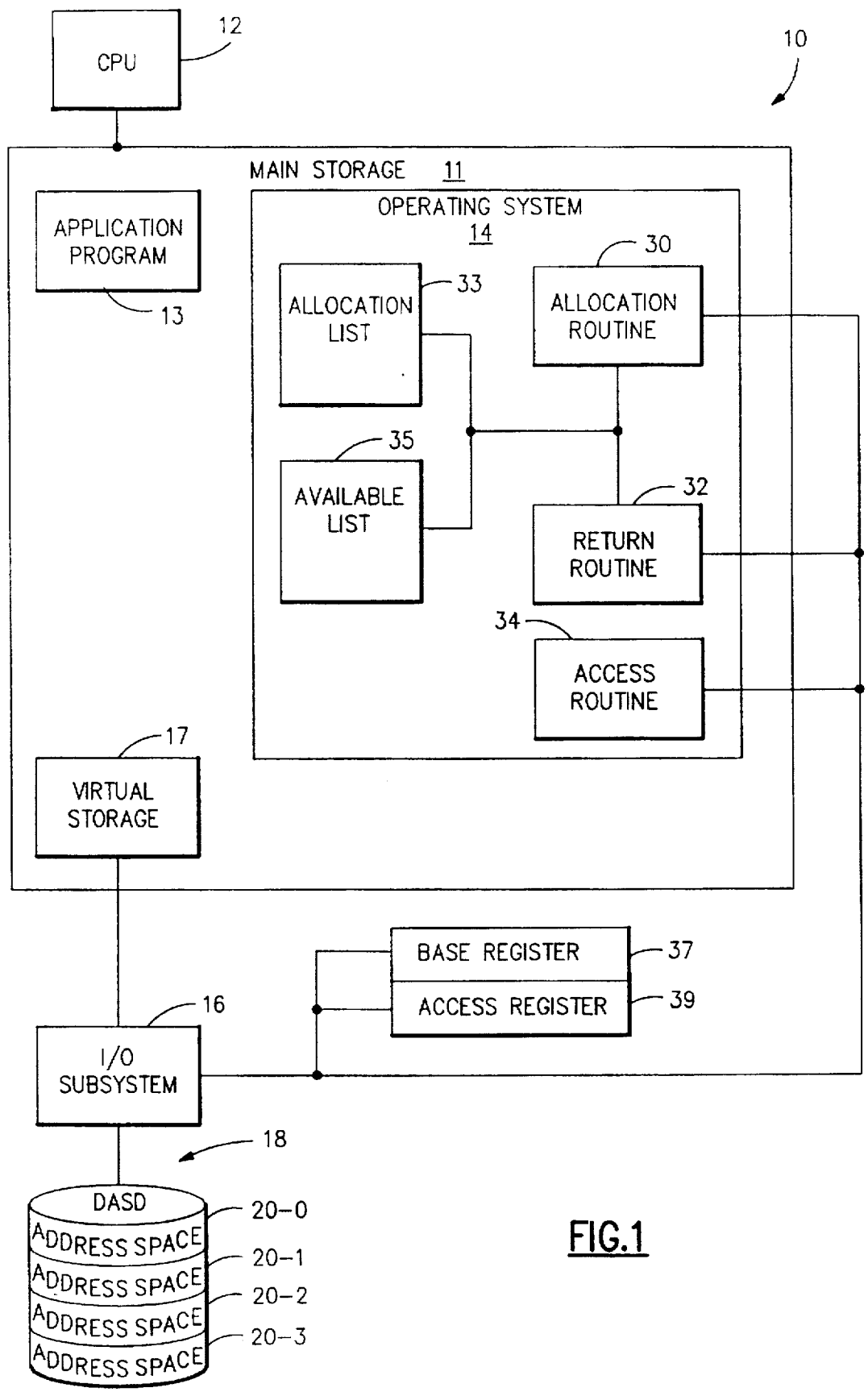
FIG. 1 is a block diagram of a computer system which manages storage according to the present invention.
Figure 2:
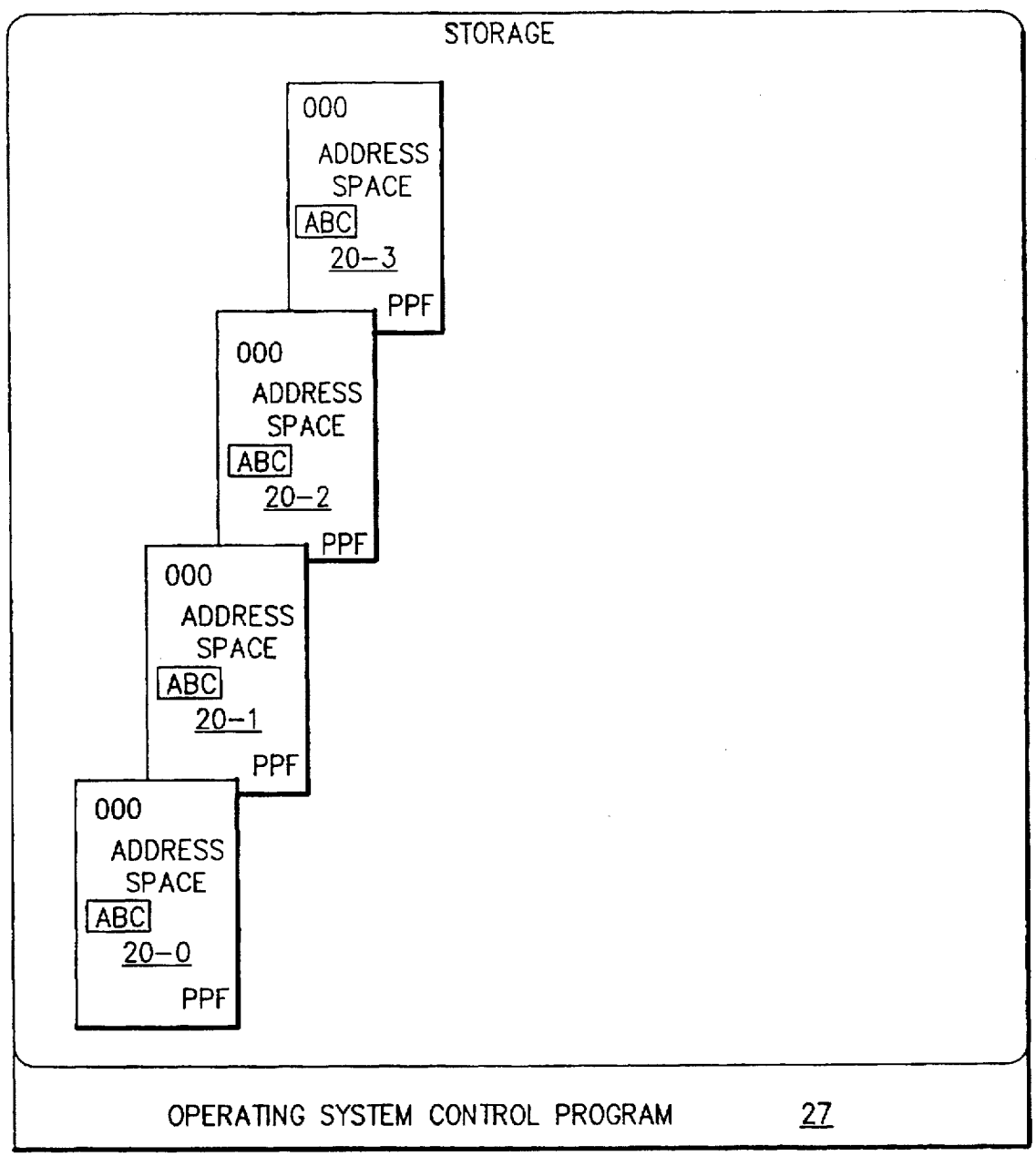
FIG. 2 is an expanded logical representation of address spaces within storage of the computer system of FIG. 1.

Referring now to the figures in detail wherein like reference numerals indicate like elements throughout the several views, FIG. 1 illustrates a computer system generally designated 10 according to the present invention. Computer system 10 comprises main storage 11, a processor 12, an application program 13 stored in main storage and executing on processor 12, an operating system 14, I/O controller/subsystem 16, virtual storage 17 and shared external storage 18 in the form of direct access storage device DASD. The application program 13 may be a user program, a user interface portion of operating system 14, or another function which requests storage. Operating system 14 may provide storage which is directly mapped to DASD 18 or logically mapped via the virtual storage 17 to other storage, not shown. Pursuant to a request by the application program 13, operating system 14 logically divides external storage 18 into a multiplicity of address spaces 20-0, 20-1, 20-2, 20-3, etc. By way of example, each of the address spaces comprises an identical amount of storage. All of the address spaces use identical offsets or addresses within the address spaces, for example, from address 000 to FFF hexadecimal. Each address space is addressed or identified as a unit by an address register token (ALET) which comprises 32 bits. However, in another embodiment of the present invention, other bits designate the particular address space. FIG. 2 represents the operating system's view of the storage which has been logically divided into the four address spaces. A control program 27 within the operating system performs the logical division of the storage 18.

Operating system 14 comprises a routine 30 for allocating blocks of free storage upon request by the application program or another function within the operating system, a routine 32 for "returning" blocks to free storage after cessation of use, and an access routine 34 for writing to and reading from main storage blocks. The allocating routine 30 selects one or more ("primary") available blocks to be allocated from the primary address space 20-0, lists the address and length of each allocated block in an allocation list 33, removes the address and length of each allocated block from an available list 35, and sends the address and length to the requestor. The return routine 32 removes the address and length of each returned block from the allocation list and lists the address and length in the available list.

The allocating routine 30 also generates management control headers and stores them within the allocated blocks in address space 20-0. The general strategy of the present invention is to store the extended management control information in "shadow" block(s) at the same offset or address within the other address space(s) 20-1,2,3 as the respective allocated block in its address space 20-0. For example, if the allocated block resides at offset or location ABC within address space 20-0 then the respective extended management control information resides at offset or location ABC within address space 20-1, 2 and/or 3. Thus, when the application program requests access to the extended management control block, the access routine 34 can locate it easily by using the address of the allocated block which is supplied by the requester, and the ALET which is also supplied by the requestor (or alternatively, a few bit identifier for the address space). However, in another embodiment of the present invention, there is a single extended management control block in a single address space correlated to each allocated block in the primary address space, for example, a predetermined correlation between the address spaces 20-0 and 20-1, so the operating system can determine in which address space to find the extended management control block without the need for the application program to supply the ALET. Nevertheless, in any of the foregoing embodiments of the present invention, neither the allocated block from the primary address space 20-0 nor the application program need store the offset into the shadow address space which stores the extended management control information. Moreover, the use of the ALET (or alternately the few bits which identify the address space) is far less burdensome than storing in the primary block the entire address of the extended management control block in the shadow address spaces 20-1,2,3. Therefore, all of the above embodiments of the present invention represent a considerable savings of storage and reduction in overhead versus the prior art in which the allocated block stores a full address pointer to the additional control information. Moreover, additional management control blocks can be stored at the same offset within other address spaces as above with minimal overhead.

Figure 3:
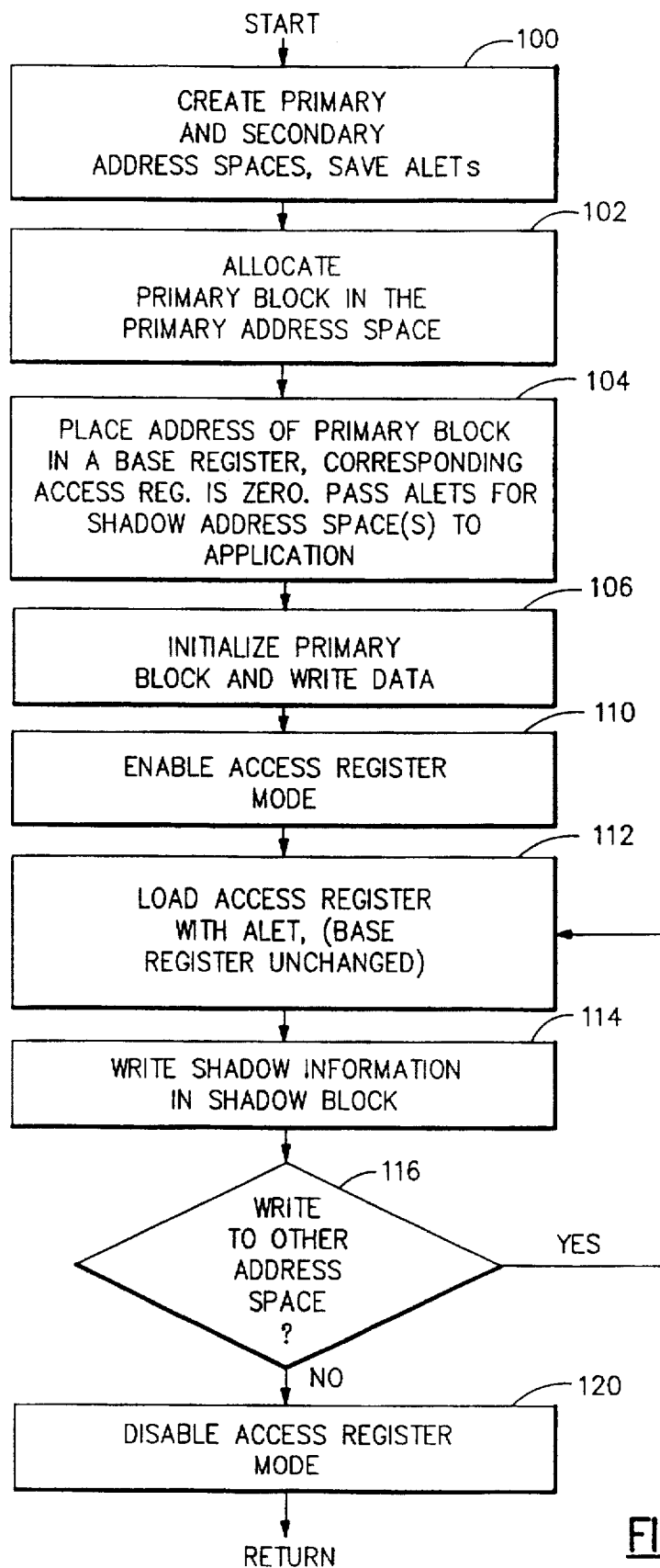
FIG. 3 is a flow chart illustrating allocation of a block and sequential access of the block to write data and access of a shadow block to write management and/or control information.
Figure 4:
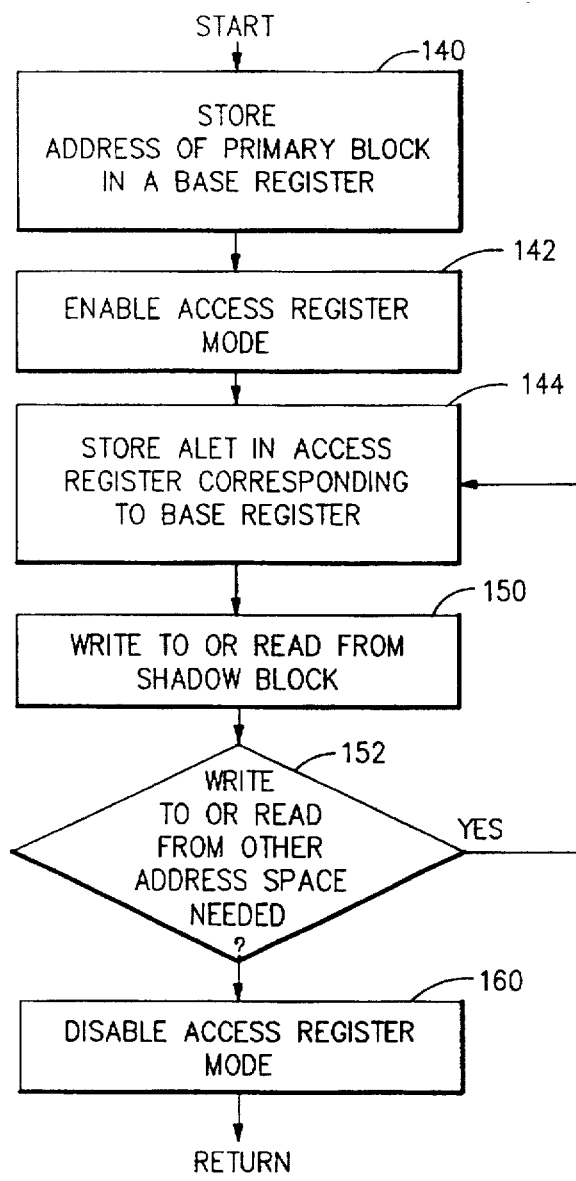
FIG. 4 is a flow chart illustrating subsequent access of the shadow block of FIG. 3 to write management and/or control information.

FIG. 3 illustrates in detail the foregoing process for allocating a primary block from address space 20-0 and then accessing the respective extended management control block in address space 20-1. In the preferred embodiment of the present invention, most of the primary block is available for productive use by the requestor (for example, to store a file) and the remainder is reserved for basic management control information. Additional management control information is stored in one or more other address spaces as extended management control information. By way of example, the basic management control information in the primary block stores the name of the current user and accounting information, and the extended management control block stores the name of past users of the primary block and time stamp of lost reference. In another embodiment of the present invention, all of the primary block is available for productive use by the requestor and all management control information is stored in an extended management control block in one or more other address spaces.

In step 100, in response to an application request, operating system 14 logically divides DASD 18 into a primary address space 20-0 and shadow or secondary address spaces 20-1,2,3. In the illustrated example, all the address spaces are the same size, for example, 16 MEG-bytes. The primary address space is identified by a binary zero, and each of the secondary address spaces is identified by a respective ALET. Each ALET is provided by the operating system. The operating system returns the ALETs to the application program so the application program can subsequently identify the secondary address space that it desires to access (at the same offset/address as the primary block). The logical division of the DASD into address spaces is further described below with reference to FIG. 6, and was previously known from the IBM VM/ESA 1.1 operating system when IPLed in "XC" mode, and a document entitled "ESA/XC Principle of Operation." This document is available from International Business Machines Corporation. Mechanicsburg, Pa. by order #SC24-5594, and Chapter 3 is hereby incorporated by reference as part of the present disclosure. The VM/ESA 1.1 operating system which supported address spaces executed in a previously known ES/9000 computer which is described in a document entitled "CP Programming Services" and available from International Business Machines Corporation, Mechanicsburg, Pa. by order #SC24-5520-1.

In step 102, operating system 14 allocates a block from the primary address space. There are various previously known techniques for selecting the block for allocation.

For example, the IBM VM/ESA 1.1 operating system provides a CMS Storage Manager macro which performs the allocation and is described in a document entitled, "VM/ESA CMS Application Development Reference For Assembler" which is also available from International Business Machines Corporation, Mechanicsburg, Pa. by order #SC24-5453-01. Chapter 2 of this document is hereby incorporated by reference as part of the present disclosure. After the block is selected, the operating system passes the block address to the application program, lists the address and length on the allocation list 33, and removes the address and length from the available list 35. The allocation routine also stores the address in base register 37 for immediate use and sets access register 39 to zero to identify the primary address space (step 104). When the block from address space 20-0 is allocated to the application program, the corresponding blocks at the same offset or address in address spaces 20-1,2,3 are automatically reserved to the same application program by passing to the application program identifications in the form of access register tokens (ALETS) for address spaces 20-1,2,3.

Next, the application program calls the operating system 14 with data to write into the primary block. In response, the access routine writes the data and/or management control information into the address currently stored in the base register in the address space indicated by the access register; presently, the access register indicates the primary address space (step 106). By way of example, the data is a file and the management control information is the name of the application program and the time of access.

Next, the application program desires to write into the corresponding extended management control block in address space 20-1. Because the base register currently stores the address of the primary block, the application program need only pass the ALET for address space 20-1 to the operating system, and the access routine enables the access register (step 110) and loads the access register with the ALET (step 112). It should be noted that it is not necessary to change the contents of the base register because the extended management control block is stored in the same offset in address space 20-1 as the primary block is stored in address space 20-0. The application program also passes to the operating system the information to be written to the extended management control block, and the access routine writes it to the extended management control block in address space 20-1 as indicated by the base register and the access register (step 114). By way of example, this information is the name of the previous application program to which the primary block was allocated (and returned) and the time of access. If desired (decision 116), the application program can supply ALETs for address spaces 20-2 and 3 and request that the operating system repeat steps 112 and 114 to write additional management control information into the same offset in address spaces 20-1,2 or 3. After completing the writing to the extended management control block(s), the operating system disables the access register (step 120).

At a later time, i.e. after the application program has accessed other primary blocks and stored other addresses in the base register, the application program calls the operating system to update the information in the foregoing extended management control block in address space 20-1 (step 140). With the call, the application program provides the information to be written, the address/offset for the primary block and the ALET for address space 20-1 of the extended management control block. This time it is necessary for the application program to supply the offset because the base address is not currently stored in the primary register. In response, the operating system writes the address/offset into the base register 37 (step 140), enables the access register 39 (step 142) and writes the ALET in the access register (step 144). Next, the access routine writes the update information into the extended management control block which resides at the address stored in the base register and in the address space indicated by the ALET in the access register (step 150). If the application program requested in step 140 to write to an additional extended management control block (decision 152), then the application program supplies the other ALET (but not the offset which is the same), and steps 144 and 150 are repeated. After completing the foregoing requests to access the extended management control block(s), the operating system disables the access register (step 160). Referring again to step 150, the application program could just have requested to read the contents of the extended management control block following steps 140, 142 and 144.

Figure 5:
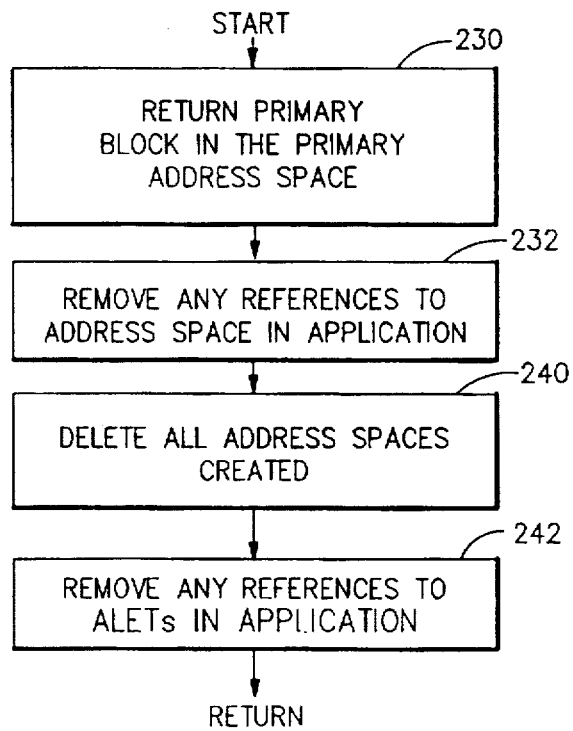
FIG. 5 is a flow chart illustrating return of the previously allocated block to storage.

As illustrated in FIG. 5, when the application program is finished using the primary block and extended management control blocks, the application program calls the operating system to return the primary block that was allocated in step 102 and supplies the address of the returned block (step 230). In response, the return routine removes the address and length from the list of allocated blocks and adds the address and length to the available list (step 230). The application program also erases any reference in the application program to this address (step 232). In the preferred embodiment of the present invention, when the application program returns the primary block, the corresponding extended management control blocks in address spaces 20-1,2 and/or 3 are considered invalid because the application program no longer stores their address.

However, the extended management control blocks are not erased until re-used and overwritten, and could still be accessed by another task holding the ALET for the address space. Next, the operating system deletes the logical definition of the address spaces 20-0,1,2,3. Finally, the application program erases all references in the application program to the ALETs for address spaces 20-1,2,3 (step 242).

Figure 6:
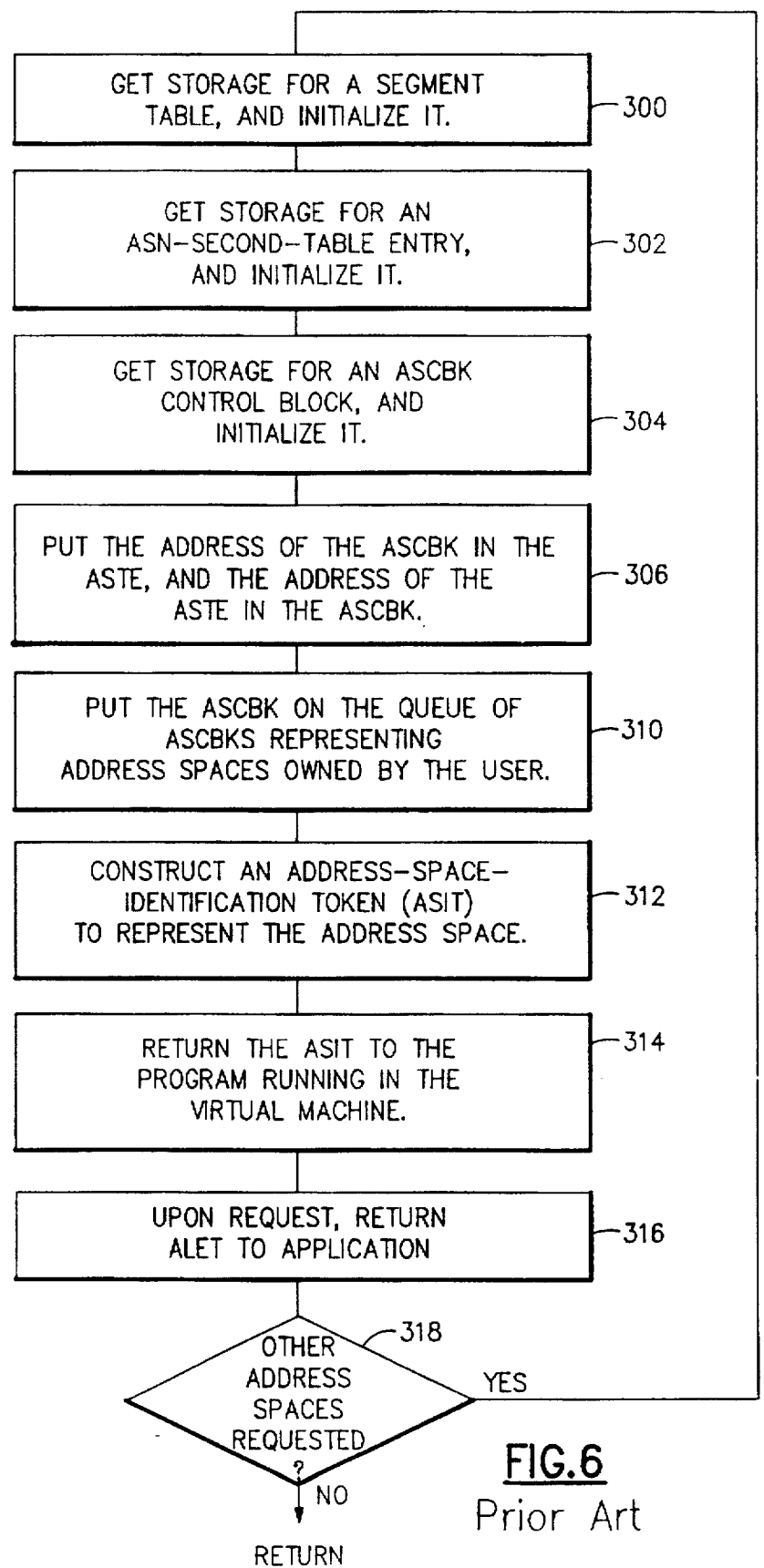
FIG. 6 is a flow chart illustrating logical division of storage 18 into four address spaces according to the prior art.

FIG. 6 illustrates in detail a process performed by control program 27 for creating address spaces 20-0,1,2,3 in response to a request by the application program. In step 300, the control program defines a segment table. As described in more detail below, the segment table maps virtual addresses to real addresses. The virtual address is the address by which the application program addresses storage. The real address is the actual address in the storage. In step 302, the control program defines an "ASN" second table entry to store a segment table designation. The segment table designation stores the address and length of the segment table. In step 304, the control program defines an address space control block (ASCBK) which stores a human readable name for the address space. The human readable name is used by application interfaces to identify the address space. In step 306, the control program stores the address of the ASCBK in the ASN second table entry next to the corresponding virtual address and real address and stores the address of the ASN second table entry in the ASCBK. Thus, the virtual address of the address space is correlated to the name of the address space. The control program maintains a queue of address spaces owned by each application program, and in step 310, the control program stores the ASCBK of this new address space on the application program's queue. In step 312, the control program defines an address space identification token for the new address space and links the token to the name of the address space, and in step 314, passes the token to the application program. If the application wants to access the address space, the application program passes the token to the control program, and the control program generates the corresponding ALET and returns the ALET to the application program. With this ALET, the application program can request that the access routine write into or read from one of the shadow data spaces 20-1,2,3. Steps 300-316 are repeated for each of the other data spaces (decision 318).

Based on the foregoing, storage management systems according to the present invention have been disclosed. However, numerous modifications and substitutions can be made without deviating from the scope of the present invention. Therefore, the present invention has been disclosed by way of illustration and not limitation, and reference should be made to the following claims to determine the scope of the present invention.

I claim:

1. A computer system for managing storage, said system comprising:

means for logically dividing the storage into a plurality of address spaces, each of said address spaces having same internal addressing as each other of said address spaces;

means, responsive to a request for a block of storage, for allocating a block of storage beginning from an address in one of said address spaces to store data, and based on said address in said one address space to store said data, reserving another block of storage beginning from said address in another of said address spaces to store management and/or control information corresponding to said data; and means for writing said data to the allocated block and writing said management and/or control information to the reserved block.

2. A computer system as set forth in claim 1 wherein the allocating means supplies said address to an application program, and said application program supplies said data and said address to the writing means to cause said writing means to write said data to said allocated block.

3. A computer system as set forth in claim 1 wherein the allocating means supplies said address to an application program, and said application program supplies said management and/or control information and said address to the writing means to cause said writing means to write said management and/or control information to said reserved block.

4. A computer system as set forth in claim 3 wherein:

the allocating means also supplies to said application program an identifier of said another address space; and said application program supplies said identifier of said another address space to the writing means along with said address and said management and/or control information to cause said writing means to write said management and/or control information to said reserved block.

5. A computer system as set forth in claim 4 wherein said allocating means supplies to the application program the identifier in the form of an access register token for said another address space.

6. A computer system as set forth in claim 1 further comprising a register for storing the address of said allocated block; and wherein the writing means uses said address of said allocated block stored in said register when writing said data to said allocated block and writing said management and/or control information to said reserved block.

7. A computer system for managing storage, said system comprising:

means for logically dividing the storage into a plurality of address spaces, each of said address spaces having same internal addressing as each other of said address spaces;

means, responsive to a request by a first application for a block of storage, for allocating a first block of storage beginning from a first address in one of said address spaces to store first data, and reserving another block of storage beginning from said first address in another of said address spaces to store management and/or control information corresponding to said first data;

means for writing said first data to the first allocated block, and writing said management and/or control information to the reserved block;

means, responsive to a request by a second application for a block of storage, for allocating a second block of storage beginning from a second address in said one address spaces to store second data, and reserving another block of storage beginning from said second address in said another address space to store management and/or control information corresponding to said second data; and means for writing said second data to the second allocated block, and writing said management and/or control information to said another reserved block beginning from said second address.

8. A method for managing storage, said method comprising the steps of:

logically dividing the storage into a plurality of address spaces, each of said address spaces having same internal addressing as each other of said address spaces;

in response to a request for a block of storage, allocating a block of storage beginning from an address in one of said address spaces to store data, and based on said address in said one address space to store said data, reserving another block of storage beginning from said address in another of said address spaces to store management and/or control information corresponding to said data; and writing said data to the allocated block, and writing said management and/or control information to the reserved block.

9. A method as set forth in claim 8 wherein the allocating step comprises the step of supplying said address to an application program, and further comprising the step of said application program supplying said address and said data to cause the data writing step to write said data to said allocated block.

10. A method as set forth in claim 8 wherein the allocating step comprises the step of supplying said address to an application program, and further comprising the step of said application program supplying said management and/or control information and said address to cause the management and/or control information writing step to write said management and/or control information to said reserved block.

11. A method as set forth in claim 10 wherein the allocating step also supplies to said application program an identifier of said another address space; and further comprising the step of said application program supplying said identifier of said another address space along with said address and said management and/or control information to cause the management and/or control information writing step to write said management and/or control information to said reserved block.

12. A method as set forth in claim 11 wherein said allocating step supplies to the application program the identifier in the form of an access register token for said another address space.

* * * * *